July 3, 1962
P. J. McGAULEY
3,042,502
RECOVERY OF ELEMENTAL SULFUR FROM SULFUR BEARING MATERIALS
Filed May 7, 1957
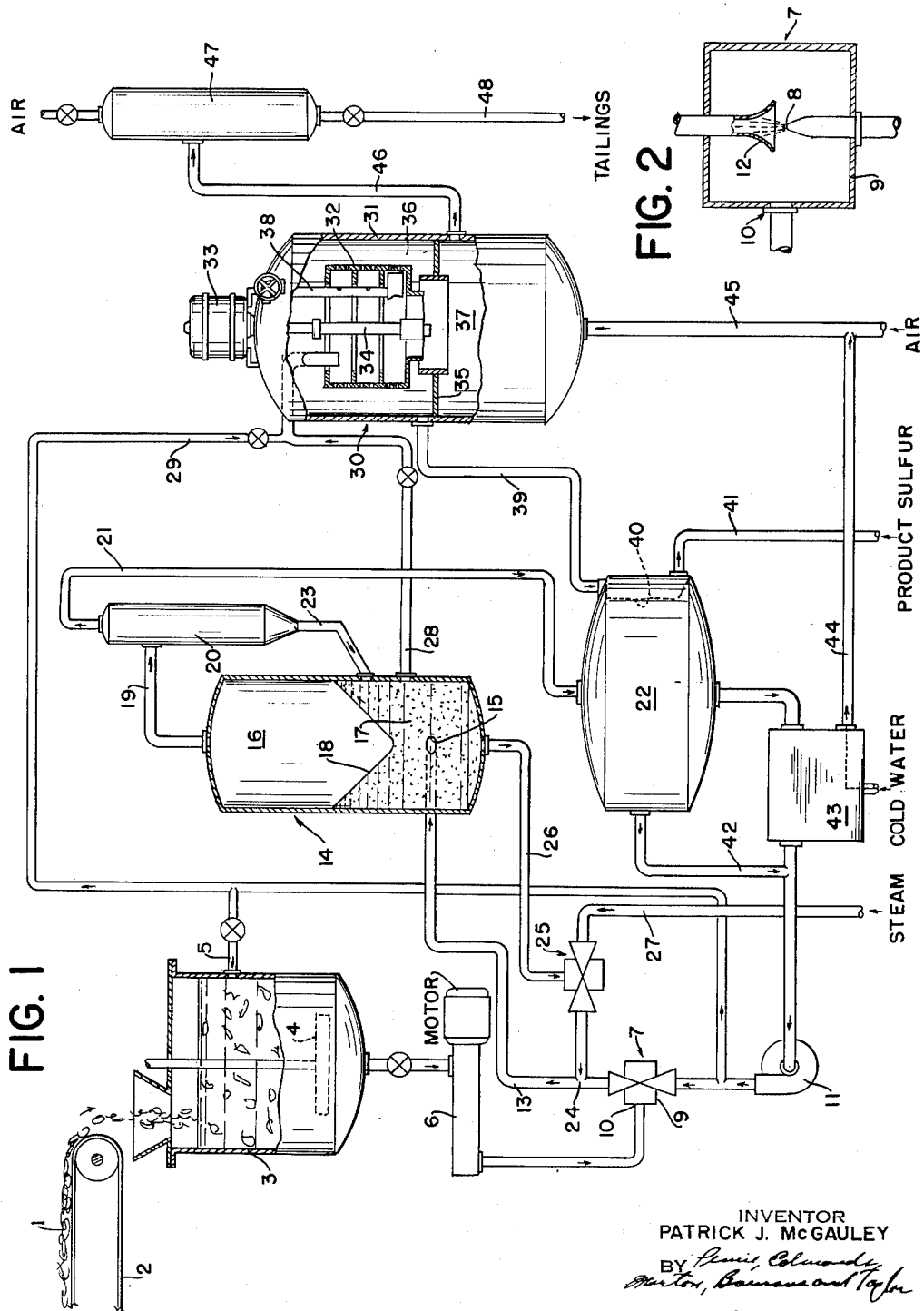
INVENTOR
PATRICK J. McGAULEY
BY
ATTORNEYS 3,042,502
RECOVERY OF ELEMENTAL SULFUR FROM SULFUR BEARING MATERIALS
Patrick J. McGauley, 36 Revere Road, Port Washington, N.Y.
Filed May 7, 1957, Ser. No. 657,582
3 Claims. (Cl. 23—308)

This invention relates to a method of recovering elemental sulfur from native sulfur bearing materials. The invention more specifically involves the method of recovering elemental sulfur from native sulfur bearing materials containing clay-like or colloidal fines. The invention involves a method of beneficiating sulfur bearing materials by removing therefrom the light colloidal gangue fines prior to recovering the elemental sulfur in pure form, as well as an overall method involving the removal of the colloidal gangue fines and the subsequent recovery of the elemental sulfur from the residual pulp by centrifugal separation. The invention further includes the use of a novel hot water circulating system and water activated jet injector system for removing the colloidal gangue fines and recovering the elemental sulfur.

In my prior United States application for Letters Patent, Serial No. 584,290, filed May 11, 1956, now Patent No. 2,934,413, I have described and claimed a method of recovering elemental sulfur from native sulfur bearing material by treatment of the sulfur bearing material in super-heated water. The contained sulfur is liquefied by the super-heated water providing a three-phase pulp containing liquid sulfur, liquid water, and the gangue solids. This three-phase pulp is then transferred to the perforated basket of a centrifugal separator. The gangue solids are retained on the basket while the liquid sulfur is sluiced free of the solids and through the perforated basket by a large recycle stream of super-heated water. The two immiscible liquids then flow into a separating vessel from which the liquid sulfur is withdrawn from the bottom as a pure finished product, while the super-heated water is withdrawn from the top and recycled to the basket of the centrifuge.

This process described and claimed in my prior application is both low in operating cost and high in extraction efficiency when the feed material contains a high proportion of sandy or non-colloidal gangue solids. I have found, however, that when the feed material contains increasing quantities of clay-like solids or colloidal gangue fines, these solids become compacted on the centrifuge basket and become impervious to drainage of the wash water. A fraction of the contained sulfur therefore cannot be sluiced free of the gangue solids. Since this remaining sulfur represents a loss of product, the process as described in my prior application becomes progressively less efficient as the ratio of colloidal gangue fines in the feed material increases. The removal of these gangue fines results in an enriched sulfur bearing material which is almost ideal as a feed for the centrifugal separation process described in my prior application. Although the gangue fines are generally of a very small size and very light in weight, the term gangue fines as used herein is not intended to be restricted to any particular size fines, but is intended to broadly include those gangue particles of a size, weight, and nature which will become compacted and substantially impervious to the drainage of wash water when subjected to a centrifuge operation of the type described. These gangue fines are sometimes referred to in the art as "slimes."

This invention broadly involves the formation of an aqueous slurry of native sulfur bearing material which has previously been crushed and ground to a suitable size. The resulting aqueous slurry, in addition to the water, contains sulfur and gangue both as fine particles and as sands or coarse particles. This slurry is heated with super-heated water to a temperature above the melting point of sulfur to form a three-phase pulp. This pulp at first contains all of the following: (a) super-heated water; (b) gangue sands; (c) gangue fines; (d) liquid sulfur particles of sand size; and (e) liquid sulfur particles of colloidal size. The colloidal liquid sulfur present in the pulp is then coalesced into larger aggregates, and the resulting three-phase pulp is separated into (1) a sulfur phase containing globules of water and water-wetted gangue sands, and (2) a water slurry phase containing globules of pure sulfur and water-wetted gangue fines. During the formation of the sulfur phase and the water phase, the gangue fines remain in the water phase in their original particle sizes, while the colloidal sulfur particles are contacted by other sulfur particles and by the sulfur phase and are thereby coagulated or "scrubbed" from the water phase pulp.

The water phase pulp is then withdrawn into a cyclone carrying with it the colloidal gangue fines and some of the sulfur and larger gangue particles which have been carried over by the flow. The sulfur and gangue sands are then separated by centrifugal classification in the cyclone and are returned to the reservoir containing the sulfur phase. The sulfur phase is withdrawn from a point below its surface and transferred to the basket of the centrifugal separator in which it is centrifuged and the sulfur flushed from the gangue sands by the recycle stream of super-heated water. The immiscible liquids are forced through the perforations in the centrifuge basket into the collecting and settling chamber, withdrawn therefrom, and the pure sulfur recovered as a finished product.

The drawing illustrates one manner of carrying out the invention and also illustrates particular types of equipment which can advantageously be used. Variations of the equipment and of the particular method disclosed in the drawing can be made by those skilled in the art without departing from the scope of this invention.

FIG. 1 is a flow diagram in which the various steps of a complete process are illustrated; and FIG. 2 is a blown-up, cross-sectional view of a water activated jet injector illustrating the principle upon which it operates.

The native sulfur bearing material, hereinafter referred to as ore, is first crushed, ground, and screened to a suitable size, preferably to a particle size of about 8 mesh, although substantially smaller or larger particles can be used in cases where it should prove to be desirable. The particle size of the crushed and ground ore is not a limitation on the method of this invention, but it is noteworthy that the process of this invention requires less grinding than other known methods of physical separation of the sulfur from surface ores.

After the ore has been ground, it contains colloidal sulfur fines and non-colloidal sulfur particles together with gangue fines and gangue sands.

The ground ore 1 is then transferred by means of the dry ore feeder 2 into a suitable slurry tank 3 provided with agitator 4 in which the ground ore is mixed with a minimum quantity of water to form a heavy aqueous slurry. The concentration of the slurry is not critical, but it is advantageous to maintain the solids content as high as possible since it is expensive and of no advantage to heat and discard the extra water.

As illustrated in the drawing, the slurry tank 3 is open to the atmosphere. The ore slurry is formed by utilizing the recycled super-heated water entering the slurry tank through the line 5. By utilizing the recycled super-heated water to form the slurry in tank 3, a preheating of the slurry is effected which reduces the amount of high pressure steam or super-heated water required to heat the slurry to the temperature for liquefying the contained sulfur. As the super-heated water from the line 5 is exposed to atmospheric pressure in the slurry tank part of it flashes into steam. The cold ore being deposited therein, however, immediately condenses this flash steam and prevents loss of steam and heat. In forming a 67 percent slurry with recycle water at about 270° F. a preheat temperature of about 170° F. will result. The temperature to which the slurry can be preheated generally will be limited by limitations of the equipment since the hot slurry is quite corrosive.

The preheated ore slurry from the tank 3 is then transferred to the screw pump 6 by gravity flow from tank 3. The function of the screw pump is to both meter and transfer the slurry to the water activated jet injector 7. The principle of operation of the water activated jet injector 7 is illustrated in FIG. 2. The injector 7 comprises a jet orifice 8 and a casing 9. The slurry enters the casing 9 as shown at 10 while super-heated water is forced into the casing at high velocity through the jet orifice 8 by means of the pump 11. The high velocity stream of water entrains and thus draws the ore slurry with it as it passes into the exit line 13. The high density slurry is thus induced into the pressurized system, heated above the melting point of sulfur, and transported by the circulating stream of super-heated water. The temperature of the circulating water is maintained constant by the direct injection of live steam into the system.

The rate of feed of the ore slurry to the water activated injector 7 can be varied considerably as will be understood by those skilled in the art. As an example of a particular plant designed to operate at about 1000 tons per day the rate of feed of the super-heated water into the casing through the jet orifice 8 can be between about 150 to 200 gallons per minute and while maintaining the temperature of the super-heated water at about 270° F. The ore slurry containing between 60 and 70 percent solids can be delivered to the water activated injector 7 at a pressure of approximately 35 p.s.i.g., a temperature of about 170° F. and at a rate of between about 15 to 20 gallons per minute. Feeding the ore slurry and the super-heated water to the water activated injector 7 at approximately this rate results in a pulp containing between about 10 to 15 percent solids exiting through the line 13. Under the above conditions, the temperature of the slurry in the exit line 13 will be about 260° F. and will be under a pressure of about 60 p.s.i.g. The three-phase pulp is agitated by means of the action of the water activated jet injector 7. This agitation results in the contacting and agglomeration of at least a portion of the colloidal sulfur into non-colloidal aggregates.

After the slurry has been heated, pressurized, diluted and agitated by the water from the jet injector 7 it flows to the sands tank 14. The function of the sands tank is: (1) to act as a sulfur scrubber or contactor in completing the removal of colloidal sulfur from the aqueous pulp by mixing that pulp with, and forcing it through, a continuous pool of liquid sulfur; and (2) to act as a storage reservoir for the centrifuge feed.

As shown at 15 in the drawing, the three-phase pulp is introduced tangentially into the circular sands tank 14 by the injector 7. The tangential introduction of the three-phase pulp into the sands tank 14 creates a stirring and cyclonic separation action of the pulp therein. The cyclonic action of the three-phase pulp in the sands tank throws the heavy gangue sands and liquid sulfur particles against the walls of the tank while concentrating the smaller, lighter and finer fractions of the pulp in the center of the tank. The pulp is thus separated into two fractions 16 and 17 as is indicated by the V-shape vortex boundary line 18. The cyclonic action also effects an agitation of the pulp resulting in the further contacting and agglomeration of the small liquid sulfur globules into larger aggregates. The bottom layer 17 consists of a continuous pool of heavy liquid sulfur and sands which mixes with, contacts, and thereby scrubs the sulfur from the aqueous pulp which is being forced through it. The aqueous pulp retains all colloidal fines which are not removed and carries these into the cyclonic classifier 20. This cyclone has been designed to remove all particles above a certain size or weight from this pulp stream. Thus, if if the pulp has been properly contacted by the liquid sulfur, all of the fine sulfur particles have been coagulated and removed, and only fine gangue particles remain with the pulp to pass through the overflow of cyclone 20 and be discarded. The underflow of cyclone 20 contains only the heavy particles of sand and sulfur. This stream is returned to the lower layer 17 in the sands tank. As shown in the drawing, the method is a continuous one and the filling of the sands tank 14 forces the continuous water phase layer 16 through the exit line 19 and into the conventional classifier 20. The colloidal fines are withdrawn from the cyclone separator 20 through the line 21 and deposited in the settling and water storage tank 22.

The agglomeration of the sulfur fines into larger sulfur globules is an important feature of this invention, since the failure to agglomerate a substantial amount of the colloidal sulfur will result in a loss of sulfur. In addition, since much of the elemental sulfur present in the ore is contained in small interstices of the gangue particles, the enlargement of the small sulfur particles removed from the gangue interstices prevents the liquid sulfur from again becoming so intimately mixed with the gangue fines that it cannot be recovered.

The layer 17 of liquid sulfur and gangue sands, now an improved and beneficiated sulfur bearing material, is withdrawn from the sands tank by means of the line 28 and transferred to the centrifugal separator 30. Prior to the centrifuge treatment for recovery of the pure sulfur this stream is joined by a flow of super-heated recycle water from line 29. Since the process described in the drawing is a continuous one, the height of the vortex of the continuous sulfur layer 17 can be controlled by the amount of feed material allowed to accumulate in layer 17 before it is withdrawn for subsequent sulfur recovery.

Although the three-phase pulp leaving the injector 7 can be transferred directly to the sands tank 14 to effect further agglomeration of the colloidal sulfur fines and the separation and removal of the gangue fines, I have found that it is convenient and advantageous to join this three-phase pulp with a circulating stream of liquid sulfur and sands from layer 17 of the sands tank. This circulation, in practice, is activated by the steam jet which supplies the heat for the process.

The liquid sulfur and gangue sands can be joined with the pulp in the exit line 13 in the manner shown in the drawing. This liquid sulfur and sands mixture is withdrawn from the sulfur layer 17 in the sands tank 14 through the line 26 and introduced into the steam activated jet injector 25. Steam is introduced into the injector by means of the line 27 and passed through a jet orifice as described with respect to the water in the injector 7. The stream of liquid sulfur and sands is thereby delivered through the injector into the exit line 13 at a point indicated by the numeral 24.

The addition of the liquid sulfur and sands into line 13 increases the sulfur content of the pulp at this point and thereby increases the number of contacts between particles of liquid sulfur. It thus increases the rate of agglomeration of the fine liquid sulfur particles into larger aggregates. In addition, the introduction of steam at this point supplies all of the heat required by the process. The introduction of the liquid sulfur, sands, and steam into line 13 also serves to increase the flow rate and thereby the agitation of the pulp to cause a further and more efficient agglomeration of the liquid sulfur fines into large liquid globules.

As described in more detail in my copending application Serial No. 584,290, filed May 11, 1956, the pressurized centrifuge 30 has a casing 31 and a revolving basket 32. The centrifuge basket is driven by a motor 33 through the shaft 34. The centrifuge is also equipped with a plow 38 or with any other device suitable to remove the solids from the walls of the basket. The guide collar or flange 35 divides the casing of the pressurized centrifuge into upper and lower portions 36 and 37, respectively.

The beneficiated three-phase pulp from the layer 17 in the sands tank is transferred through the line 28 together with recycle water from line 29 to the revolving basket of the centrifuge. The two liquids are thereby separated from the solids by centrifugal force. As the three-phase pulp is fed to the basket 32 the two immiscible liquids, water and sulfur, are flushed from the centrifuge basket with the recycle stream of super-heated water from the line 29. This recycle continuously replaces the water flushed from the solids so as to maintain the gangue solids in a water-wetted or flooded condition in the basket. In this manner, the sulfur is flushed or sluiced from the retained solids by the added water. The absence of the colloidal gangue fines in the feed prevents sealing of the interstices of the gangue on the centrifuge basket and thus enables the liquid sulfur to be flushed or sluiced from the gangue solids by the recycle water.

The liquid sulfur and the super-heated water are flushed out of the centrifuge basket into the upper portion 36 of the centrifuge and are withdrawn therefrom and transferred by means of the line 39 to a suitable separator or sulfur trap 40. The separator shown in the drawing is essentially a settling vessel disposed within or in communication with the hot water storage tank 22. The sulfur quickly settles to the bottom of the separator and is withdrawn as a finished product through the outlet 41. This product will generally analyze 99.5 percent sulfur. The super-heated water from the separator 40 overflows into the water storage tank 22 and is available for reuse in the plant.

As the sulfur is flushed from the retained solids on the centrifuge basket, the pulp gradually becomes a two-phase mixture of water and sand. When the basket is substantially full of solid gangue, the feeding of the three-phase pulp is discontinued and feeding of the super-heated water can be increased so as to maintain the gangue solids in the basket in a water flooded condition until substantially all of the liquid sulfur globules are washed from the retained gangue. The flush water can then be discontinued and the residue allowed to centrifuge dry of water. The dry solids can then be removed from the basket by means of the plow 38 or cold water jets and passed through the outlet at the bottom of the basket into the pressurized repulp chamber in the bottom portion 37 of the centrifuge casing as shown in the drawing. The solid gangue residue in the bottom portion 37 of the centrifuge can be repulped with water, preferably cold water, and transferred to the tailings or discard pond in various manners. I have found that it is advantageous to repulp the solid gangue residue in conjunction with the colloidal gangue fines residue in the manner shown in the drawing and described below.

As discussed above, the colloidal gangue fines are discharged into the settling and water storage tank 22. The gangue fines settle to the bottom of tank 22 permitting this tank to act as a collecting basin for the substantially clean super-heated water from the cyclone 20 and the centrifuge 30. The super-heated water from the tank 22 can thus be withdrawn therefrom through the line 42 and used to form the original ore slurry, to preheat the ore slurry, to form the three-phase pulp, and as the flush water in the centrifuging operation. As the gangue fines collect in the settling tank 22, they can be withdrawn from the bottom of the tank as shown in the drawing and transferred to the pressurized bowl centrifuge 43. The centrifuge 43 removes the hot water from the gangue fines and returns it to pump 11 for recycle in the same manner as the super-heated water from the water storage tank 22. The centrifuged gangue fines can then be repulped with cold water in the centrifuge 43 and transferred by means of line 44 and the airlift 45 to the lower chamber 37 of the centrifuge. By utilizing this system the super-heated water contained in the gangue fines can be reused and the solid gangue residue resulting from the centrifuge operation repulped together with the colloidal gangue fines in one operation. The cold water used to repulp the gangue fines is used in a sufficient amount to effect the repulping of the gangue fines and also the residue from the centrifuge operation. The combined repulped gangue residues can then be throttled from the lower chamber 37 of the centrifuge by means of the line 46 to the air separator 47 and the residue throttled to the tailings pond by means of the line 48.

Both high- and low-grade native sulfur bearing materials as well as concentrates can be processed according to this invention for recovery of the elemental sulfur. The sulfur bearing materials can be associated with various different gangue materials such as silica, limestone, gypsum, pyrites, and the like. In practicing this invention, the native sulfur bearing feed materials will generally contain a sufficient amount of gangue fines so that the loss of sulfur due to their presence would economically warrant their removal prior to the recovery of the pure elemental sulfur. If the sulfur bearing feed material does not contain a significant amount of clay or gangue fines, that feed can be processed economically without prior removal of the clay or gangue fines according to the process described in my prior application Serial No. 584,290.

I claim:

1. In the method of recovering elemental sulfur from native sulfur bearing materials containing gangue fines, gangue sands, and sulfur fines which comprises forming an aqueous slurry of the sulfur bearing material, heating the aqueous slurry to a temperature above the melting point of sulfur to form a three-phase pulp containing liquid water, liquid sulfur fines, gangue fines, and gangue sands, coagulating the liquid sulfur fines into non-colloidal sulfur aggregates, separating the gangue fines from the pulp by hydroclassification, and centrifuging the resulting pulp at a temperature sufficient to maintain the sulfur in the liquid state while continuously maintaining the solids in a water flooded condition.

2. In the method of recovering elemental sulfur from native sulfur bearing materials containing gangue fines, gangue sands, and sulfur fines which comprises forming an aqueous slurry of the sulfur bearing material, heating the aqueous slurry to a temperature above the melting point of sulfur to form a three-phase pulp containing liquid water, liquid sulfur fines, gangue fines, and gangue sands, coagulating the liquid sulfur fines into non-colloidal sulfur aggregates, separating the pulp by hydroclassification into a sulfur phase containing essentially all of the sulfur and gangue sands and a water phase containing essentially all of the gangue fines, and centrifuging the sulfur phase at a temperature sufficient to maintain the sulfur in the liquid state and while continuously maintaining the solid gangue sands in a water flooded condition.

3. In the method of recovering elemental sulfur from native sulfur bearing materials containing gangue fines, gangue sands, and sulfur fines which comprises forming a preheated aqueous slurry of the sulfur bearing material by mixing the sulfur bearing material with recycled super-heated water, heating the aqueous slurry to a temperature above the melting point of sulfur with recycled super-heated water to form a three-phase pulp containing liquid water, liquid sulfur fines, gangue fines, and gangue sands, coagulating the liquid sulfur fines into non-colloidal sulfur aggregates, separating the pulp into a sulphur phase containing essentially all of the sulfur and gangue sands and a water phase containing essentially all of the gangue fines, removing that fraction of the water phase which contains the gangue fines, separating the water from the gangue fines, discarding the gangue fines, utilizing the separated super-heated water for recycling, removing the sulfur phase, and centrifuging the sulfur phase at a temperature sufficient to maintain the sulfur in a liquid state while maintaining the gangue sands in a water-flooded condition by a recycle stream of super-heated water.

References Cited in the file of this patent

UNITED STATES PATENTS

| | | |
|---|---|---|
| 1,318,015 | Sedgwick | Oct. 7, 1919 |
| 1,408,467 | Perry et al. | Mar. 7, 1922 |
| 2,539,019 | Hill | Jan. 23, 1951 |
| 2,835,561 | Benz | May 20, 1958 |